(12) United States Patent
Takeno (10) Patent No.: US 10,726,682 B2
(45) Date of Patent: Jul. 28, 2020

(54) CHECKOUT APPARATUS

(71) Applicant: TOSHIBA TEC KABUSHIKI KAISHA, Tokyo (JP)

(72) Inventor: Yuishi Takeno, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/012,177

(22) Filed: Jun. 19, 2018

(65) Prior Publication Data

US 2019/0012883 A1 Jan. 10, 2019

(30) Foreign Application Priority Data

Jul. 7, 2017 (JP) ................................ 2017-134000

(51) Int. Cl.
*G07G 1/00* (2006.01)
*G07G 1/01* (2006.01)
*G06Q 20/20* (2012.01)

(52) U.S. Cl.
CPC ......... *G07G 1/0072* (2013.01); *G06Q 20/208* (2013.01); *G07G 1/009* (2013.01); *G07G 1/0054* (2013.01); *G07G 1/01* (2013.01)

(58) Field of Classification Search
CPC .... G07G 1/0072; G07G 1/0054; G07G 1/009; G07G 1/01; G06Q 20/208
See application file for complete search history.

(56) References Cited

U.S. PATENT DOCUMENTS

| | | | |
|---|---|---|---|
| 5,143,164 A | 9/1992 | Nahar | |
| 2002/0148896 A1* | 10/2002 | Persky | G06Q 30/02 235/383 |
| 2003/0047387 A1 | 3/2003 | Bogat | |

(Continued)

FOREIGN PATENT DOCUMENTS

JP 2008-059503 A 3/2008

OTHER PUBLICATIONS

Extended European Search Report dated Nov. 26, 2018 in corresponding European Patent Application No. 18182183.6, 9 pages.

*Primary Examiner* — Sonji N Johnson
(74) *Attorney, Agent, or Firm* — Kim & Stewart LLP (57) ABSTRACT

A checkout apparatus according to an embodiment includes a weighing scale that measures a weight on a surface thereof. A hand-held scanner acquires commodity identifying information corresponding to a commodity at an arbitrary position. A fixed scanner acquires commodity identifying information corresponding to a commodity at a reading position. In an initial state, if a change in the measured weight on the surface is greater than the predetermined amount when no commodity identifying information has been received in the initial state, a processor receives the commodity identifying information acquired by the first information input device. The processor determines whether a change in the measured weight is within a predetermined range based on the acquired commodity identifying information. If the change is within the predetermined range, the processor registers the commodity corresponding to the acquired commodity identifying information. The processor performs a settlement processing for payment of each registered commodity.

18 Claims, 6 Drawing Sheets

(56) References Cited

U.S. PATENT DOCUMENTS

| | | |
|---|---|---|
| 2010/0139989 A1 | 6/2010 | Atwater et al. |
| 2013/0075168 A1 | 3/2013 | Amundsen et al. |
| 2014/0023241 A1 | 1/2014 | Sugasawa et al. |
| 2014/0140574 A1 | 5/2014 | Takeno |
| 2015/0082857 A1 | 3/2015 | Reed |
| 2015/0242833 A1 | 8/2015 | Itani et al. |
| 2016/0110702 A1* | 4/2016 | Landers, Jr. ....... G01G 19/4144 705/17 |
| 2017/0161711 A1* | 6/2017 | Chin ................... G06Q 20/208 |

* cited by examiner

CHECKOUT APPARATUS

CROSS-REFERENCE TO RELATED APPLICATION

This application is based upon and claims the benefit of priority from Japanese Patent Application No. 2017-134000, filed Jul. 7, 2017, the entire contents of which are incorporated herein by reference.

FIELD

Embodiments described herein relate generally to a checkout apparatus.

BACKGROUND

A self-service register (self-service checkout POS or self-service checkout apparatus) carries out registration and transaction settlement with respect to a commodity through an operation by a customer (user) who purchases the commodity. For example, in a large retail store, both the self-service register and a registration apparatus operated by a store clerk are installed together in many cases. In such an application, it is desired to provide an apparatus capable of reducing a burden on the customer in order to improve a usage ratio of the self-service register. On the other hand, a conventional self-service register is provided with a function (weight check process) of checking weight so as to detect presence of an unregistered commodity or the like. In the weight check process, it is determined whether a difference between weight of registered commodities and weight on a placement table on which a shopping bag containing the registered commodities is set is within an allowable range. If it is determined that the difference therebetween is beyond the allowable range, the self-service register displays an error message and stops registration of the commodities.

The conventional self-service register carries out the weight check process on the assumption that a commodity is packed in a shopping bag after the customer completes registration of the commodity. Therefore, if the commodity is packed in the shopping bag before the commodity is registered, the conventional self-service register displays an error notification or the like to instruct the customer to take out the unregistered commodity, and thus, the registration of the commodity cannot be completed.

However, in an actual application, it may be necessary to perform a key operation to register a commodity temporarily held by the customer. In such a situation, the customer needs to perform the key operation with one hand while holding the commodity with the other hand, or to temporarily put the commodity at a place other than the shopping bag and then perform the key operation. In the conventional self-service register, even if the key operation needs to be performed, it may not be possible to place a commodity in the shopping bag until the registration of the commodity is completed, thereby reducing work efficiency. As the reduction of the work efficiency causes a stress to the customer, there is a problem that the usage ratio of the self-service register is reduced accordingly.

DETAILED DESCRIPTION

A checkout apparatus according to an embodiment includes a weighing scale that measures a weight on a surface thereof. A first information input device acquires commodity identifying information corresponding to a commodity at an arbitrary position including the surface. A second information input device acquires commodity identifying information corresponding to a commodity at a reading position of the second information input device, the reading position not including the surface. In an initial state, a processor receives the commodity identifying information acquired by any one of the first and second information input devices, or, if no commodity identifying information is received, determines whether a change in the measured weight on the surface is greater than a predetermined amount. If the change in the measured weight on the surface is greater than the predetermined amount when no commodity identifying information has been received in the initial state, the processor receives the commodity identifying information acquired by the first information input device. After the commodity identifying information has been received, the processor determines whether a change in the measured weight on the surface is within a predetermined range based on the acquired commodity identifying information. If the change in the measured weight on the surface is within the predetermined range, the processor registers the commodity corresponding to the acquired commodity identifying information. When the commodity is registered, the processor returns to the initial state. The processor performs a settlement processing for payment of each registered commodity.

Hereinafter, an embodiment will be described with reference to the accompanying drawings.

Figure 1:
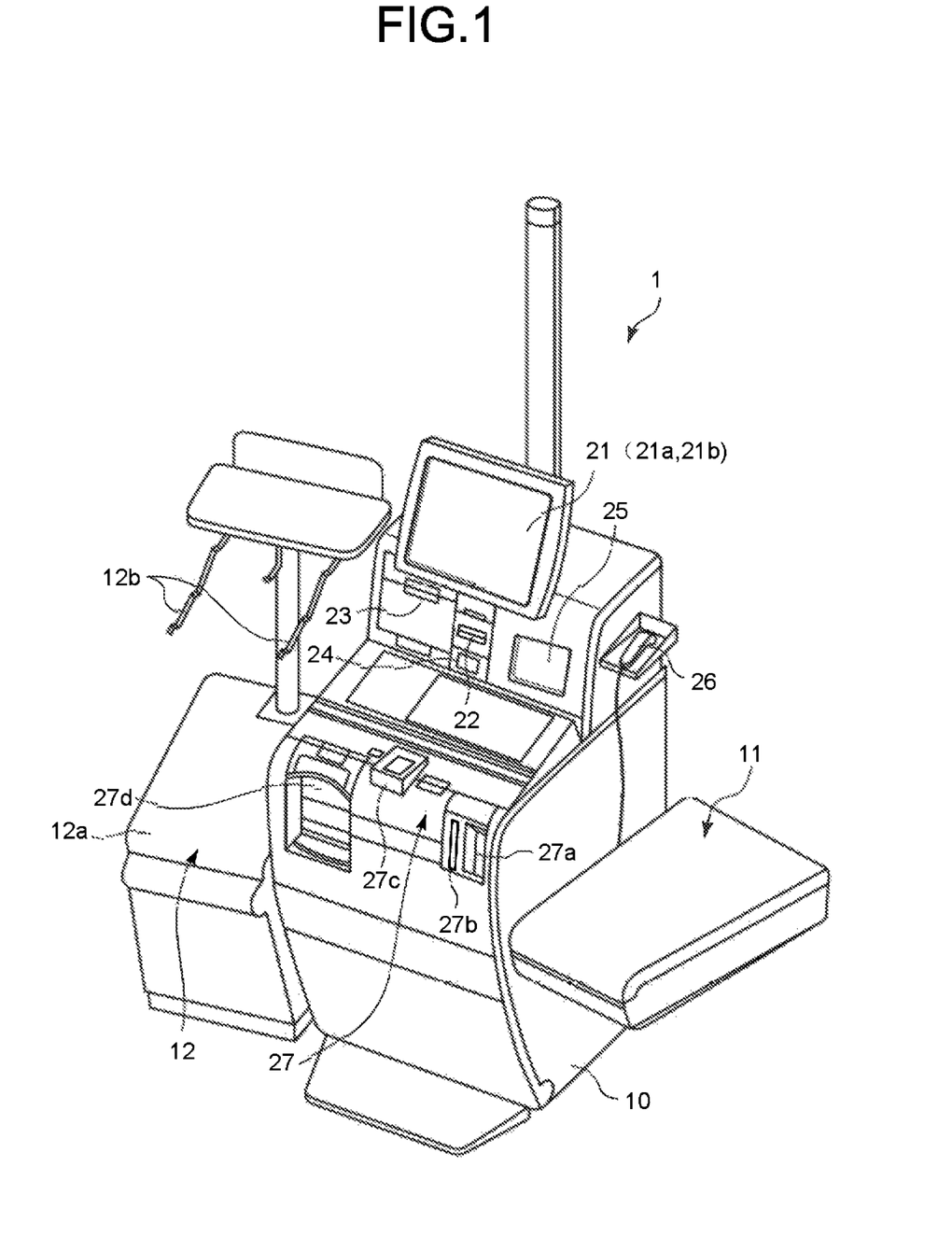
FIG. 1 is a perspective view illustrating a checkout apparatus according to an embodiment.

FIG. 1 is a perspective view illustrating a checkout apparatus 1 according to the present embodiment.

The checkout apparatus 1 according to the present embodiment is a self-service register (self-service checkout POS) operated by a customer (user) who purchases a commodity to execute various processes. The checkout apparatus 1 carries out a settlement (checkout) process and a registration process including registering commodity information of a commodity which is a settlement target. The configuration of the checkout apparatus described in the following embodiment may be applied to a commodity registration apparatus in a POS system.

The checkout apparatus 1 may communicate with a server. The server is a computer having a function of communicating with the checkout apparatus 1. For example, the server may manage information (commodity information) about each commodity, a processing result (settlement information) in the checkout apparatus 1, customer information, or the like. The server may manage a commodity database for storing commodity information to be referred to by the checkout apparatus 1.

In the configuration example shown in FIG. 1, the checkout apparatus 1 includes a main body 10, a first commodity placement table 11 and a second commodity placement table 12 which are arranged on the left and right sides of the main body 10. A commodity to be subjected to a registration process for registering commodity information is placed on the first commodity placement table 11. In the example shown in FIG. 1, the first commodity placement table 11 is arranged on the right side of the main body 10. A shopping basket containing a commodity (a commodity to be subjected to the registration process) that a customer wants to purchase is placed on the first commodity placement table 11. Alternatively, the commodity to be subjected to the registration process may be directly placed on the first commodity placement table 11.

A commodity already subjected to the registration process or a next commodity to be subjected to the registration process is placed on the second commodity placement table 12. In the example shown in FIG. 1, the second commodity placement table 12 is arranged on the left side of the main body 10. For example, a commodity registered by reading commodity identifying information (e.g., a barcode or a commodity image) by a scanner 25 or a hand-held scanner 26 (described later) is placed on the second commodity placement table 12. A commodity that has been registered by inputting commodity identifying information through the key operation by a touch panel 21b (i.e., the commodity already subjected to the registration process) is placed on the second commodity placement table 12.

Furthermore, in the checkout apparatus 1 according to the present embodiment, a next commodity to be subjected to the registration process (i.e., the next commodity to be registered) can also be placed on the second commodity placement table 12. For example, a commodity for which the commodity information is input through the key operation by the touch panel 21b may be placed on the second commodity placement table 12. The hand-held scanner 26 may read the commodity identifying information from the commodity in a state in which the commodity to be subjected to the registration process next is placed on the second commodity placement table 12.

The second commodity placement table 12 includes a weighing scale 12a. The weighing scale 12a measures the weight of the commodity placed on the second commodity placement table 12. Further, above the second commodity placement table 12, a holding arm 12b for holding a shopping bag in a state in which the shopping bag is opened may be provided. However, the weighing scale 12a can measure the weight of commodities placed in the shopping bag held by the holding arm 12b.

The main body 10 includes a display 21, a card reader/writer (RW) 22, a printer 23, a speaker 24, a scanner 25, a hand-held scanner 26, and a cash processing device 27. These devices 21 to 27 are connected to a controller 30 (refer to FIG. 2) located in the main body 10.

The display 21 includes a display device 21a and a touch panel 21b and functions as an input device. The display device 21a is, for example, a liquid crystal display device, an organic EL display device or the like. The display device 21a displays an operation guide, icons (touch keys) selectable by a customer, an error message, and the like. The display device 21a also displays information about the commodity already subjected to the registration process, a total amount of registered commodities, an ID of a customer, a settlement result of a commodity, and the like.

The touch panel 21b detects a touch position by a customer on a display screen of the display device 21a. The touch panel 21b sends information indicating the detected touch position to a processor 40 (described later). For example, the display device 21a displays a GUI (Graphical User Interface) including touch keys for inputting instruction selections such as a payment method (cash or card) through a touch operation by the customer. The touch panel 21b detects a touch on a display position of the touch key on the display device 21a, and sends the detected information to the processor 40. In the commodity registration process (described later), the touch panel 21b functions as an input device for inputting the commodity identifying information.

The display device 21a displays a guide screen, an information input screen, a commodity registration screen, a settlement screen, and the like. The guide screen notifies the customer of an operation method. The information input screen is used, for example, for inputting information about a commodity with no barcode attached thereto. The commodity registration screen displays information about a registered commodity. For example, information about a commodity identified by a barcode read by the scanner 25 or the hand-held scanner 26, and information about a commodity identified through the key operation are displayed on the commodity registration screen. The settlement screen displays a total amount of registered commodities, a deposit amount, and a change amount in a checkout process in which a customer pays for the commodities.

The card reader/writer (RW) 22 processes a card. The card RW 22 has a card insertion port. The card RW 22 has a function of reading data recorded on the card and a function of writing data to the card. The card processed by the card RW 22 may be a magnetic card for recording magnetic information or an IC card of a contact type or a non-contact type.

For example, the card RW 22 processes a card, such as a credit card or a membership card, in connection with settlement payment. The card may be inserted in the card insertion port for processing. A credit card, a debit card, an electronic money card, a prepaid card and the like are provided as the card for settlement payment. The membership card includes member information for identifying a member, or points that can be used as a service. The card RW 22 may communicate with a portable terminal (a mobile phone, a smartphone, a tablet PC, or the like) having a non-contact type communication function. The card RW 22 may have a mechanism for processing plural types of cards.

The printer 23 prints information on an image forming medium such as a paper. The printer 23 is a thermal printer, an impact dot printer or the like. For example, the printer 23 issues a receipt by printing various character strings, images, and the like on a receipt paper. The printer 23 prints a receipt indicating processing contents such as the settlement result. The printer 23 has a receipt issuing port and discharges the printed receipt from the receipt issuing port.

The speaker 24 issues a warning sound as an alert, a notification sound as a message or other sounds.

The scanner 25 is one of the information input devices for inputting the commodity identifying information. The scanner 25 is an image reading device at a fixed position and reads an image of a predetermined reading area.

The scanner 25 reads a barcode attached to the commodity as the commodity identifying information. The scanner 25 detects the barcode from an image read of the reading position, and outputs information obtained by decoding the detected barcode as the commodity identifying information. For example, the customer holds a commodity over the scanner 25 in such a manner that a barcode attached to the commodity faces the reading position, and in this way, the scanner 25 optically reads an image including the barcode of the commodity. As a result, the scanner 25 recognizes the commodity identifying information (e.g., commodity code)

indicated by the barcode included in the scanned image and outputs the recognized commodity identifying information.

The scanner 25 also has a function of selecting candidates of the commodity by performing image recognition process (i.e., object recognition) on an image of the commodity. For example, in a second operation example described later, it is assumed that the scanner 25 has a barcode reading function and an object recognition function.

The hand-held scanner 26 is one of the information input devices for inputting the commodity identifying information. The hand-held scanner 26 is an image reading device (mobile type scanner) which is held in a hand of the customer and reads an image at a reading position determined based on an operation by the customer. The hand-held scanner 26 has a function of reading the barcode attached to the commodity as the commodity identifying information. The hand-held scanner 26 detects the barcode from the read image, and outputs information obtained by decoding the detected barcode as the commodity identifying information. For example, when the customer brings the reading position of the hand-held scanner 26 close to the barcode attached to the commodity, the hand-held scanner 26 optically reads the image including the commodity barcode. Accordingly, the hand-held scanner 26 recognizes the commodity identifying information (e.g., commodity code) indicated by the barcode included in the scanned image and outputs the recognized commodity identifying information.

Figure 2:
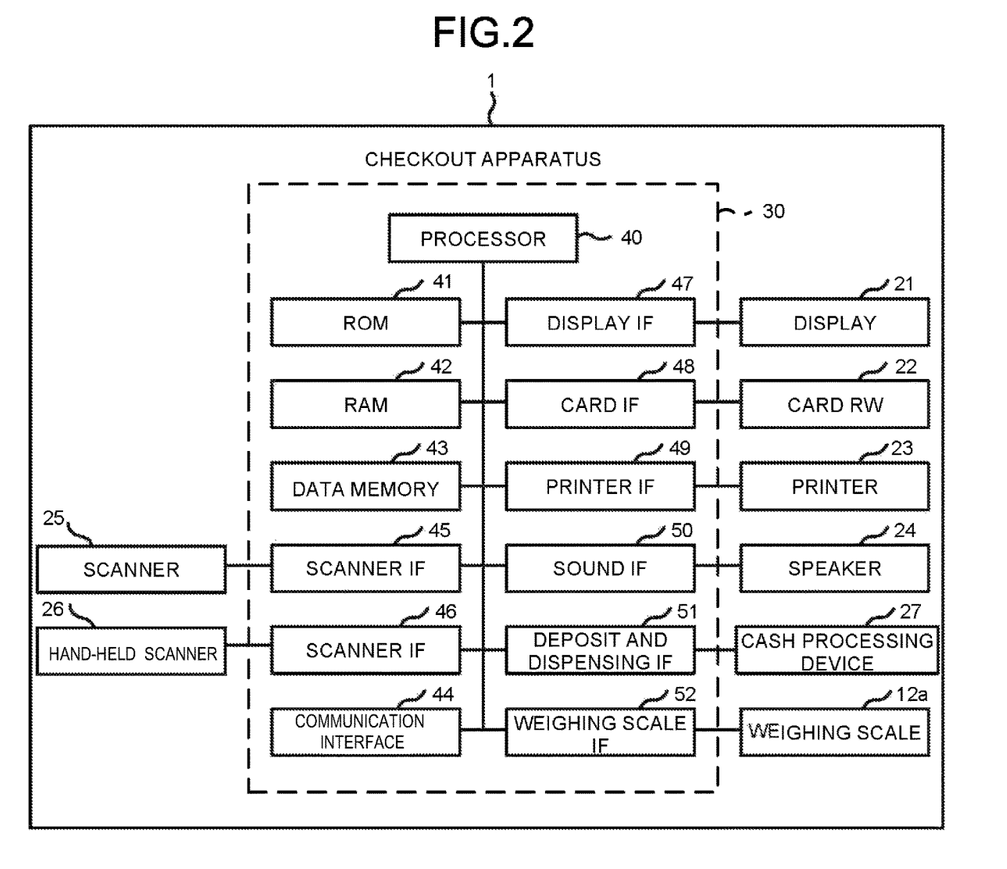
FIG. 2 is a block diagram illustrating a hardware configuration of a control system in the checkout apparatus.

Alternatively, the barcode recognition process or the object recognition process may be carried out by the processor 40 of the controller 30. In this case, the scanner 25 or the hand-held scanner 26 only supplies the image read at the reading position to the processor 40 (i.e., the scanned image). The processor 40 may carry out the barcode recognition process or the object recognition process on the scanned image received from the scanner 25 or the hand-held scanner 26.

The cash processing device 27 processes cash. The cash processing device 27 has a bill insertion port 27a, a bill discharge port 27b, a coin slot 27c and a coin discharge port 27d. The cash processing device 27 processes bills inserted in the bill insertion port 27a. The cash processing device 27 discharges bills as change from the bill discharge port 27b. The cash processing device 27 receives coins inserted in the coin slot 27c and processes the received coins. The cash processing device 27 discharges coins as change from the coin discharge port 27d.

The information input device for inputting the commodity identifying information is not limited to the fixed type scanner, the hand-held scanner, the touch panel, and the like. For example, a RFID reader may be provided as the information input device for inputting the commodity identifying information. The RFID reader as the information input device may read the commodity identifying information from a tag (RFID) attached to the commodity.

Next, a hardware configuration of a control system in the checkout apparatus 1 is described.

FIG. 2 is a block diagram illustrating the hardware configuration of the control system in the main body 10 of the checkout apparatus 1 according to the present embodiment.

In the configuration example shown in FIG. 2, the main body 10 of the checkout apparatus 1 includes the controller 30. The controller 30 is, for example, a computer. The display 21, the card reader/writer 22, the printer 23, the speaker 24, the scanner 25, the hand-held scanner 26, the cash processing device 27, and a weighing scale are electrically connected to the controller 30. The controller 30 includes a processor 40, a ROM (Read-Only Memory) 41, a RAM (Random-Access Memory) 42, a data memory 43, a communication interface 44, and various hardware interfaces (IFs) 45 to 52.

The processor 40 executes various processes by executing programs. The processor 40 is, for example, a CPU (central process unit). The processor 40 realizes various processing functions by executing programs stored in the ROM 41 or the data memory 43. For example, the processor 40 executes a commodity process including a registration process and a score calculation process by executing programs for the commodity process. The processor 40 executes a settlement process for settling the price of a commodity by executing a program for the settlement (checkout) process.

The ROM 41 is a non-volatile memory and stores programs and data. For example, the ROM 41 stores programs such as an operating system, a middleware, an application and the like. The ROM 41 may store data referred to when the processor 40 executes various processes.

The RAM 42 stores data for operations. The RAM 42 is used as a so-called work area. The RAM 42 appropriately stores data to be referred to or data temporarily used when the processor 40 executes various processes.

The data memory 43 stores data. The data memory 43 is a rewritable non-volatile memory. The data memory 43 is, for example, an EEPROM® (Electric Erasable Programmable Read-Only Memory), a HDD (Hard Disk Drive), a SSD (Solid State Drive) or the like. The data memory 43 stores data used when the processor 40 executes various processes or data generated in the processes executed by the processor 40. The data memory 43 may store various programs executed by the processor 40. The data memory 43 may include a commodity database for storing commodity information of each commodity that may be a target commodity.

The RAM 42 or the data memory 43 stores information about the commodity registered in the commodity process, calculated scores, a result of the settlement process, and the like. The RAM 42 or the data memory 43 stores, for example, the information about the registered commodity as data in a list format. The RAM 42 or the data memory 43 may store the weight measured by the weighing scale 12a. For example, if there is a change in weight greater than or equal to a predetermined threshold value in the weight measured by the weighing scale 12a, the processor 40 may store the change in the weight in the RAM 42.

The communication interface 44 is an interface for communicating with an external device such as a server. The communication interface 44 communicates with a computer such as the server via a network such as a LAN (Local Area Network). The checkout apparatus 1 may communicate with other checkout apparatuses via the communication interface 44. The checkout apparatus 1 may acquire information about the commodity from the server 2 through the communication interface 44. The communication interface 44 may transfer the information about the registered commodity stored in the RAM 42 or the data memory 43 or a settlement result with respect to the commodity to the server 2.

The processor 40 is connected to the scanner 25 via a scanner IF 45. The processor 40 acquires information (reading result of the barcode, a result of the image recognition process, or the scanned image) from the scanner 25 through the scanner IF 45. The processor 40 is connected to the hand-held scanner 26 via a scanner IF 46. The processor 40 acquires an image (reading result of the barcode or the scanned image) from the hand-held scanner 26 via the scanner IF 46. The processor 40 may recognize the commodity identified by the barcode by decoding the barcode included in the scanned image acquired from the scanner 25 or the hand-held scanner 26.

The processor 40 is connected to the display 21 via a display IF 47. The processor 40 controls content displayed on the display device 21*a* of the display 21 via the display IF 47. The processor 40 acquires information indicating a touch position detected by the touch panel 21*b* of the display 21 via the display IF 47. The processor 40 detects an input with respect to each icon displayed on the display device 21*a* based on the information indicating the touch position acquired from the touch panel 21*b*.

The processor 40 is connected to the card reader/writer 22 via a card IF 48. The processor 40 controls processes of the card by the card reader/writer 22 via the card IF 48. For example, the processor 40 executes the settlement process using a credit card processed by the card reader/writer 22. The processor 40 may read information such as a customer ID from the card presented by the customer with the card reader/writer 22.

The processor 40 is connected to the printer 23 via a printer IF 49. The processor 40 controls the printer 23 via the printer IF 49. For example, the processor 40 issues a receipt indicating the result of a checkout process (e.g., transaction details) with the printer 23. The processor 40 is connected to the speaker 24 via a sound IF 50. The processor 40 controls a sound output from the speaker 24 through the sound IF 50.

The processor 40 is connected to the cash processing device 27 via a deposit and dispensing IF 51. The processor 40 controls the cash processing device 27 through the deposit and dispensing IF 51. For example, the cash processing device 27 counts the cash deposited by the customer, and the processor 40 acquires information indicating a deposit amount counted by the cash processing device 27. The processor 40 performs control to enable the cash processing device 27 to dispense a change calculated from the deposited amount and a total amount of commodities already registered.

The processor 40 is connected to the weighing scale 12*a* via a weighing scale IF 52. The processor 40 acquires the weight from the weighing scale 12*a* via the weighing scale IF 52. For example, the processor 40 acquires the weight of the commodity placed on the second commodity placement table 12 which is measured by the weighing scale 12*a* in the registration process for registering the commodity information of the commodity which is the settlement target. The processor 40 acquires the weight of the commodity on the second commodity placement table 12 measured by the weighing scale 12*a* continuously in the registration process (for example, at a predetermined cycle).

The first operation example and the second operation example in the checkout apparatus 1 configured as described above are described below.

First Operation Example

Figure 3:
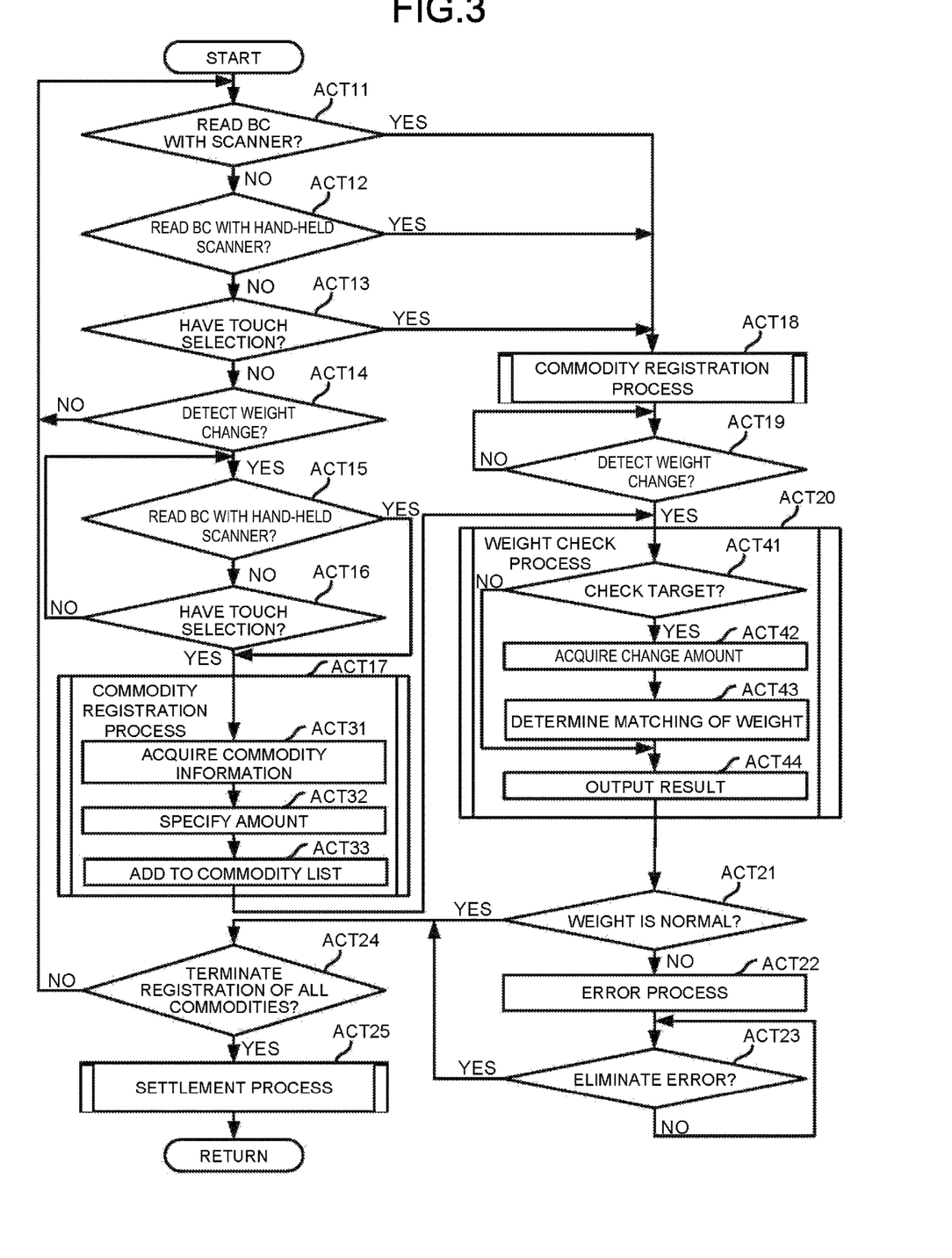
FIG. 3 is a flowchart depicting an example sequence of operations of the checkout apparatus to the present embodiment.

FIG. 3 is a flowchart depicting a first example sequence of operations of the checkout apparatus 1.

In the first operation example, it is assumed that recognizing the commodity using object recognition processing on the commodity image is not performed in registration process of the commodity. In the first operation example, the scanner 25 or the hand-held scanner 26 reads the barcode attached to each commodity to determine the commodity identifying information.

If the checkout process is executed, the customer carries the commodity to be purchased and stands in front of the checkout apparatus 1. The customer places the commodity to be purchased on the first commodity placement table 11 and instructs the start of the checkout process. For example, the customer places a shopping basket containing the commodity to be purchased on the first commodity placement table 11 and instructs the start of the checkout process through the touch panel 21*b*.

If the checkout process is started, the processor 40 receives an input of the commodity identifying information and detects change in the weight on the second commodity placement table 12 in an initial state (ACTs 11 to 14).

The processor 40 receives an input of the commodity identifying information (i.e., the barcode reading result) from the scanner 25 functioning as the information input device (ACT 11). For example, in a case of registering the commodity using the barcode, the customer brings the commodity close to the reading position of the scanner 25 in such a manner that the barcode of the commodity to be registered faces the scanner 25. The scanner 25 reads the image of the commodity held over the reading position. The scanner 25 detects the barcode from the read image, and supplies the information obtained by decoding the detected barcode to the controller 30 as the commodity identifying information. If the commodity identifying information is acquired from the scanner 25 (Yes in ACT 11), the processor 40 of the controller 30 executes the registration process of the commodity based on the acquired commodity identifying information (ACT 18).

The processor 40 receives the input of the commodity identifying information by the hand-held scanner 26 functioning as the information input device (ACT 12). For example, the customer brings the reading position of the hand-held scanner 26 close to the commodity placed on the first commodity placement table 11 or the barcode of the commodity held by the customer in his/her hand. The hand-held scanner 26 reads an image including the barcode of the commodity held in the reading position. The hand-held scanner 26 detects the barcode from the read image, and then supplies the information obtained by decoding the detected barcode to the controller 30 as the commodity identifying information. If the commodity identifying information is acquired from the hand-held scanner 26 (Yes in ACT 12), the processor 40 of the controller 30 executes the registration process of the commodity based on the acquired commodity identifying information (ACT 18).

The processor 40 also receives the input of the commodity identifying information through the key operation detected by the touch panel 21*b* functioning as the information input device (ACT 13). The processor 40 displays the operation screen including a touch key for selecting and inputting the commodity on the display 21 and detects the key operation on the operation screen by the touch panel 21*b*. For example, the processor 40 receives an input of the commodity identifying information of a commodity with no barcode attached thereto or a commodity whose barcode cannot be detected through the key operation. If the commodity identifying information is input through the key operation using the touch panel 21*b* (Yes in ACT 13), the processor 40 executes the registration process of the commodity based on the input commodity identifying information (ACT 18).

The processor 40 executes the registration process of the commodity in ACT 18 which is the same as the registration process of the commodity in ACT 17 described later. If the registration process of the commodity is completed, the processor 40 detects the change in the weight on the second commodity placement table 12 based on the weight measured by the weighing scale 12*a* (ACT 19). If the weight change is detected after the registration process of the commodity (Yes in ACT 19), the processor 40 executes a weight check process (ACT 20). The weight check process of ACT 20 is described in detail later.

The processor 40 receives the input of the commodity identifying information in ACTs 11 to 13 and detects change in the weight on the second commodity placement table 12 (ACT 14). For example, the processor 40 monitors the weight change on the second commodity placement table 12 based on the weight measured by the weighing scale 12*a*. The processor 40 sets a threshold value for the amount of change in the weight measured by the weighing scale 12*a*, and detects a weight change exceeding the threshold value. By setting a threshold value for detecting the weight change, it is possible to operate such that minute changes and temporary changes are ignored.

If the weight change is detected before the input of the commodity identifying information (Yes in ACT 14), the processor 40 receives the input of the commodity identifying information for the commodity which corresponds to the weight change (ACTs 15 and 16). In this case, the processor 40 prohibits the input of the commodity identifying information by the scanner 25 and receives the input of the commodity identifying information by the hand-held scanner 26 or the key operation. Such control permits the registration process of the commodity in a state in which the unregistered commodity is placed on the second commodity placement table 12.

That is, the processor 40 does not determine an error state when the commodity is placed on the second commodity placement table 12 before the registration process. This allows the customer to first place unregistered commodities, such as a commodity that the customer needs to lift with both hands, on the second commodity placement table 12. As a result, the customer can place the commodity whose barcode is not read by the scanner 25 on the second commodity placement table 12 before the registration process.

In a conventional system, the unregistered commodity cannot be placed on the second commodity placement table 12, so the customer needs to temporarily put the unregistered commodity whose barcode is not read by the scanner 25 at another location. In this case, the customer places the commodity at a location other than the second commodity placement table 12 and performs an operation of inputting the commodity identifying information by the hand-held scanner 26 or the key operation. The commodity placed at the location other than the second commodity placement table 12 is then placed again on the second commodity placement table 12 after inputting the commodity identifying information (i.e., after the registration process of the commodity is completed). It is obvious that the work efficiency of the customer decreases with such procedures. On the other hand, in the checkout apparatus 1 according to the present embodiment, it is possible to improve the work efficiency of the customer by permitting placement of the commodity on the second commodity placement table 12 before the registration process.

If the processor 40 acquires the commodity identifying information from the hand-held scanner 26 after detecting the weight change (Yes in ACT 15), the processor 40 executes the registration process of the commodity based on the acquired commodity identifying information (ACT 17).

If the commodity identifying information is input through the key operation after the detection of the weight change (Yes in ACT 16), the processor 40 executes the registration process of the commodity by the input commodity identifying information (ACT 17).

The processor 40 executes the processing in ACTs 31 to 33 as the commodity registration process. In the commodity registration process, the processor 40 uniquely specifies the commodity based on the input commodity identifying information and acquires the commodity information corresponding to the uniquely specified commodity (ACT 31). The processor 40 acquires the commodity information corresponding to the commodity by retrieving the commodity database based on the acquired commodity identifying information. The commodity database may be provided in a server that can communicate with the checkout apparatus 1 via the communication interface 44, or may be held in the data memory 43. For example, the commodity information includes information such as a commodity name, a commodity code, a unit price, a tax rate, an exclusion flag for weight check, an allowable range of the weight, and the like.

If the commodity information is acquired based on the input commodity identifying information, the processor 40 specifies a price of the commodity from the acquired commodity information (ACT 32). For example, the processor 40 calculates the price of the commodity from the unit price and the tax rate included in the acquired commodity information. If the price of commodity is specified, the processor 40 adds information such as the commodity information and the price to a commodity registration list created in the RAM 42 or the data memory 43 (ACT 33).

If the registration process (ACT 17) of the commodity after detecting the weight change is completed, the processor 40 executes the weight check process (ACT 20). The weight check process is a process of determining whether the amount of change in weight before and after the registration process of the commodity matches the weight of the registered commodity. The weight check process is executed through the procedures in ACTs 41 to 44, for example.

In the weight check process, the processor 40 determines whether or not the weight check is necessary for the registered commodity (ACT 41). For example, the processor 40 checks the exclusion flag for the weight check which is included in the commodity information of the registered commodity. If the exclusion flag for weight check is set, the processor 40 determines that the registered commodity is not a weight check target. If the exclusion flag for weight check is not set, the processor 40 determines that the registered commodity is the weight check target.

If it is determined that the registered commodity is not the weight check target (No in ACT 41), the processor 40 terminates the weight check normally regardless of the weight measured by the weighing scale 12*a* (ACT 44).

If it is determined that the registered commodity is the weight check target (Yes in ACT 41), the processor 40 acquires the amount of change in weight from before and after the registration process of the commodity (ACT 42). For example, the processor 40 acquires the amount of change in weight based on the difference between the weight of the commodity measured by the weighing scale 12*a* before the registration process and the weight thereof after the registration process.

If the amount of change in weight is acquired, the processor 40 determines whether or not the acquired amount of change in weight is within the allowable range as a weight matching determination (ACT 43). For example, the processor 40 determines the allowable range of the weight for the commodity from the commodity information of the registered commodity. If the allowable range of the weight is determined for the registered commodity, the processor 40 determines whether or not the acquired amount of change in weight is within the allowable range of the weight for the commodity.

If it is determined that the amount of change in weight is within the allowable range, the processor 40 outputs a determination result indicating that the weight on the second commodity placement table 12 is normal (ACT 44). If it is determined that the amount of change in weight is beyond the allowable range, the processor 40 outputs a determination result indicating that the weight on the second commodity placement table 12 is not normal (ACT 44).

If it is determined that the weight is normal in the weight check process (Yes in ACT 21), and the registration of all commodities is not terminated (No in ACT 24), the processor 40 returns to the process in ACT 11 and sets the initial state to receive a registration of a next commodity.

Figure 4:
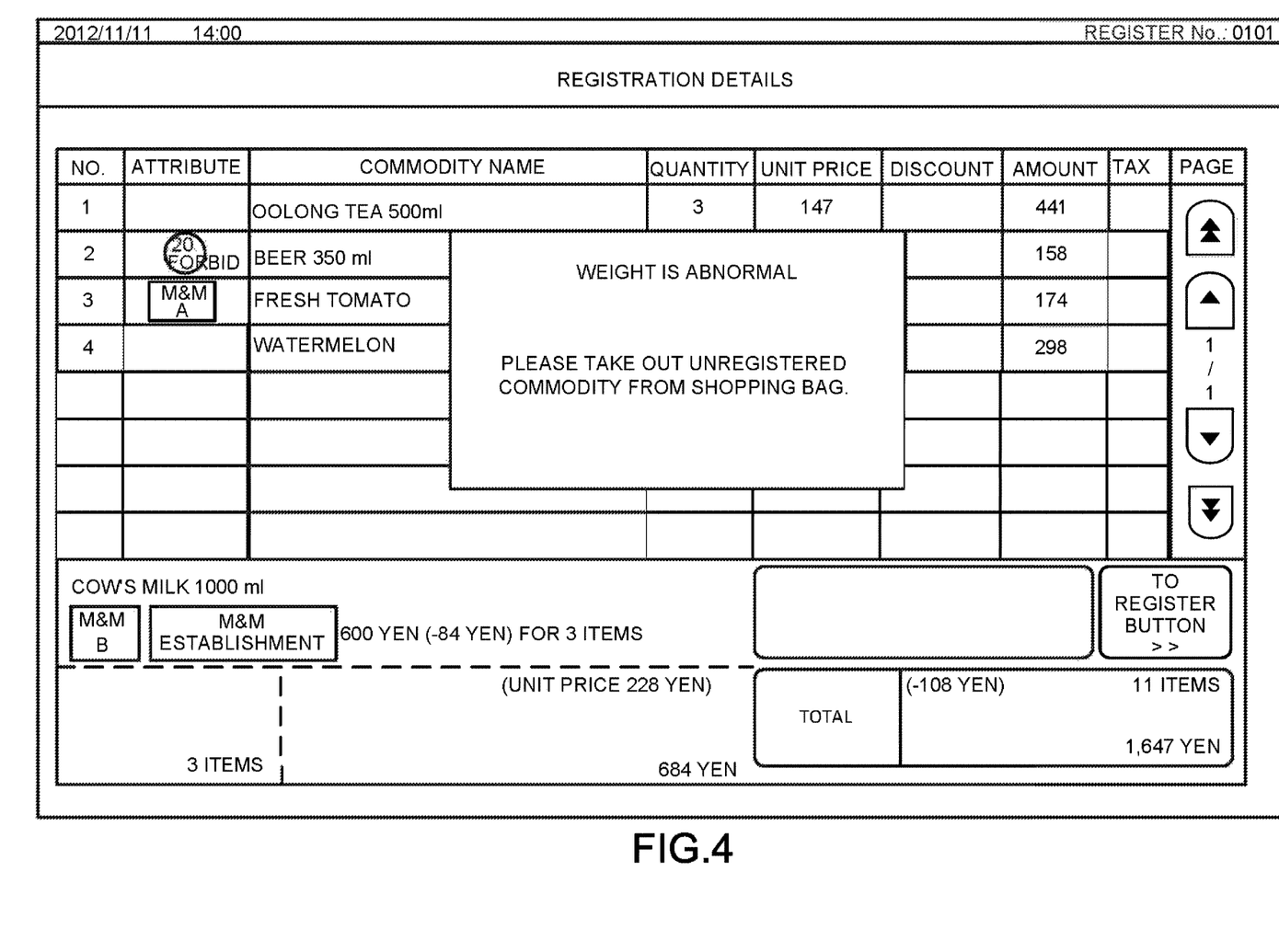
FIG. 4 illustrates an example screen displayed by the checkout apparatus when an error occurs according to a weight check process according to the present embodiment.

If it is determined that the weight is not normal in the weight check process (No in ACT 21), the processor 40 executes an error process (ACT 22). The processor 40 notifies the customer that the weight on the second commodity placement table 12 is not normal as the error process. For example, FIG. 4 shows an example of an error screen displayed on the display 21 which indicates that the weight is not normal. In the screen shown in FIG. 4, a display window including an error message is displayed on the screen on which the registered commodity list is displayed.

If the error process is executed, the processor 40 receives an operation to eliminate the error (ACT 23). For example, the processor 40 may continue to measure the weight with the weighing scale 12a while displaying an error message and then eliminate the error message if the weight on the second commodity placement table 12 is changed to be within the allowable range. The processor 40 may receive an operation instruction for eliminating the error through an operation by a store clerk.

If it is determined that the error is eliminated (Yes in ACT 23), the processor 40 proceeds to the process in ACT 24. If the registration of all commodities is not terminated (No in ACT 24), the processor 40 returns to the process in ACT 11 and sets the initial state to receive the registration of the next commodity.

In the initial state in which the registration of the next commodity is received, the processor 40 also receives an instruction to terminate the registration process of the commodity (commodity process) and to proceed to the settlement process. If proceeding to the settlement process is instructed (Yes in ACT 24), the processor 40 executes the settlement (checkout) process on the commodities registered in the registered commodity list (ACT 25).

In other words, the customer who determines that the registration of all commodities which are the settlement targets is completed instructs the termination of the registration of all commodities (or the transition to checkout process). For example, the customer operates the touch key displayed on the display 21 to instruct the termination of the registration process for all commodities. If the termination of the registration process for all commodities is instructed, the processor 40 displays a list of commodities registered based on the registered commodity list and the settlement information such as a settlement amount on the display 21.

After the settlement information is displayed, the processor 40 executes the settlement process (checkout process) to settle the total amount of all the registered commodities. In the checkout apparatus 1, the price of the commodity may be settled with the credit card presented by the customer to the card RW 22, or may be settled by cash processed by the cash processing device 27. Here, the settlement method for the price of the commodity is not limited to a specific method. If the settlement process is completed, the processor 40 issues a receipt on which contents (transaction details) of the settlement process is printed by the printer 23, and terminates the series of checkout processes.

As described above, the checkout apparatus according to the first operation example receives the input of the commodity identifying information by the information input device (the scanner, the hand-held scanner or the touch panel) in the initial state, and detects the change in the weight on the second commodity placement table. If the weight change is detected in the initial state, the checkout apparatus further receives the input of the commodity identifying information by the hand-held scanner and the touch panel. If the commodity identifying information is input after detecting the weight change, the checkout apparatus performs the weight check based on the detected weight change after the registration process of the commodity.

As a result, the checkout apparatus can carry out the registration process of the commodity in a state in which the commodity before registration is placed on the second commodity placement table. Furthermore, it is possible to perform the weight check after registration for the commodity previously registered while being placed on the second commodity placement table. As a result, it is possible to provide the checkout apparatus which can carry out a process of improving the work efficiency of the customer while carrying out the weight check of the registered commodity.

Second Operation Example

Figure 5:
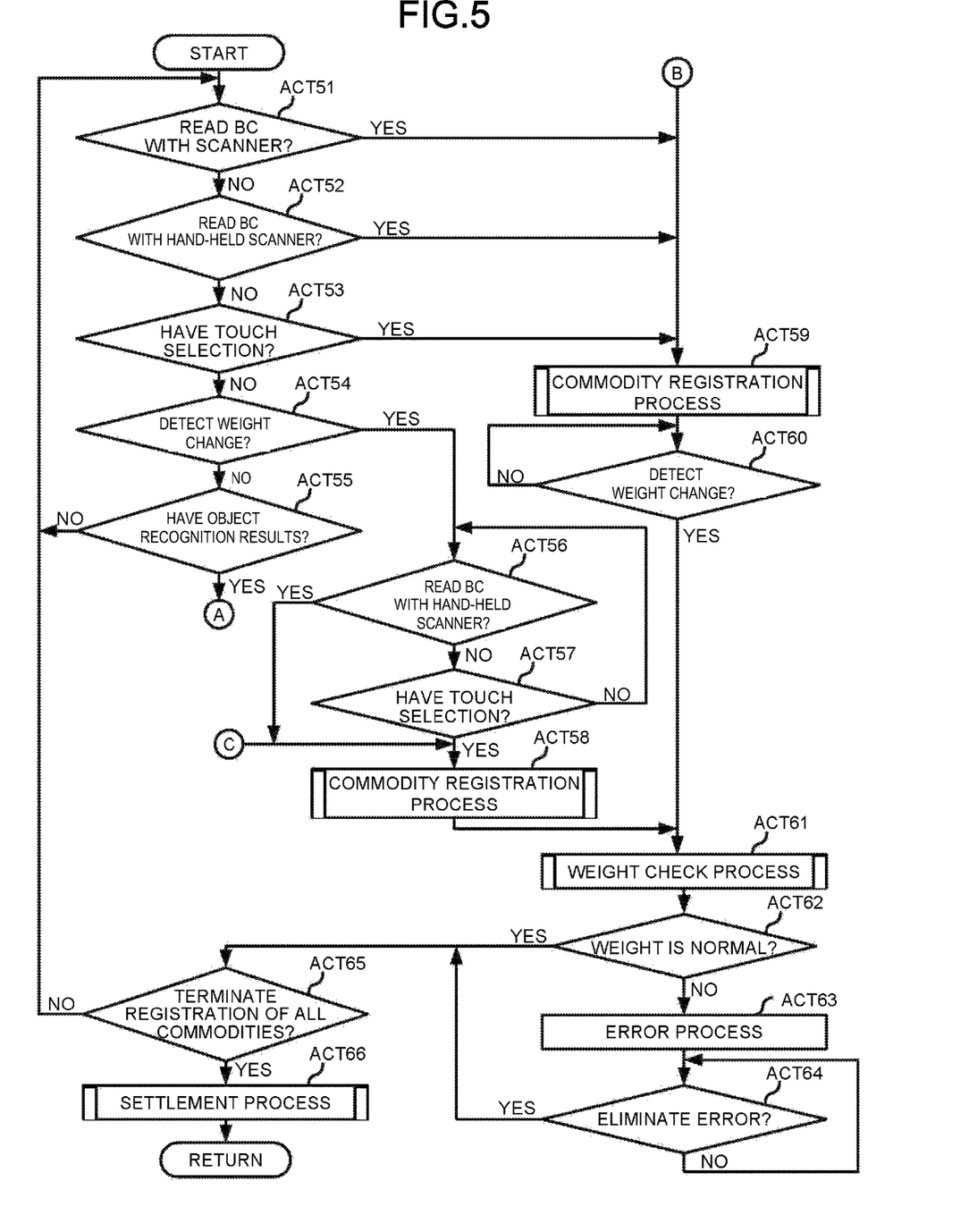
FIGS. 5 and 6 are flowcharts depicting a second example sequence of operations of the checkout apparatus.
Figure 6:
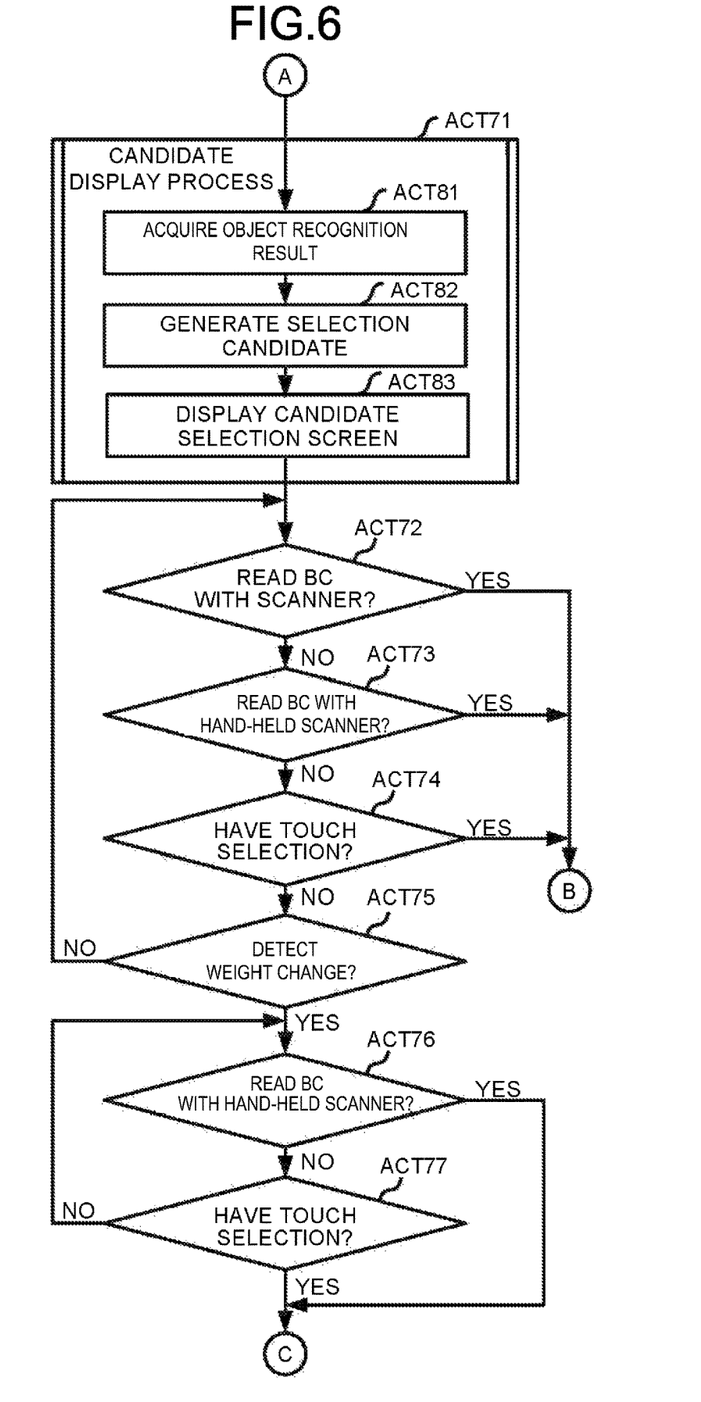

In the second operation example, the object recognition process for recognizing a commodity from the image of the commodity is also performed in addition to the barcode recognition on the scanned image read by the scanner 25. In the second operation example, in the image recognition process for the scanned image, one or more candidates of the commodity are obtained. If a plurality of candidates of the commodity is obtained in the image recognition process, one commodity is selected from the candidates of the commodity through the touch panel 21b. The image recognition process for the scanned image may be performed by the scanner 25 or by the processor 40.

FIG. 5 and FIG. 6 are flowcharts depicting the second operation example of the checkout apparatus 1.

In the initial state, the processor 40 receives the input of the commodity identifying information, a detection result of the change in the weight on the second commodity placement table 12, and an image recognition result (ACTs 51 to 55).

Specifically, the processor 40 receives the input of the commodity identifying information indicated by the barcode by the scanner 25 functioning as the information input device (ACT 51). The scanner 25 reads the image of the commodity held over the reading position. The scanner 25 detects the barcode from the scanner image and supplies the information obtained by decoding the detected barcode to the controller 30 as the commodity identifying information. If the commodity identifying information as the reading result of the barcode is acquired from the scanner 25 (Yes in ACT 51), the processor 40 of the controller 30 executes the registration process of the commodity based on the acquired commodity identifying information (ACT 59).

The processor 40 also receives the input of the commodity identifying information indicated by the barcode by the hand-held scanner 26 functioning as the information input device (ACT 52). The hand-held scanner 26 reads the image of the commodity held over the reading position. The hand-held scanner 26 detects the barcode from the scanned image and supplies the information obtained by decoding the detected barcode to the controller 30 as the commodity identifying information (reading result of the barcode). If the commodity identifying information as the reading result of the barcode is acquired from the hand-held scanner 26 (Yes in ACT 52), the processor 40 of the controller 30 executes the registration process of the commodity based on the acquired commodity identifying information (ACT 59).

The processor 40 receives the input of the commodity identifying information through the key operation detected by the touch panel 21b functioning as the information input device (ACT 53). The processor 40 displays an operation screen including the touch key capable of selecting and inputting a commodity on the display 21 and detects the key operation on the operation screen by the touch panel 21b. If the commodity identifying information is input through the key operation using the touch panel 21b (Yes in ACT 53), the processor 40 executes the registration process of the commodity based on the input commodity identifying information (ACT 59).

If the registration process of the commodity in ACT 59 is completed, the processor 40 executes the weight check process (ACT 61) after detecting the weight change for the registered commodity (Yes in ACT 60). The weight check process in ACT 61 may be the same as that in ACT 20 (ACTs 41 to 44) in FIG. 3 described in the first operation example.

The processor 40 receives the input of the commodity identifying information in ACTs 51 to 53 and detects the change in the weight on the second commodity placement table 12 (ACT 54). The processor 40 monitors the weight change on the second commodity placement table 12 based on the weight measured by the weighing scale 12a.

If the weight change is detected before the input of the commodity identifying information (Yes in ACT 54), the processor 40 receives the input of the commodity identifying information for the commodity corresponding to the weight change (ACTs 56 and 57). In this case, the processor 40 prohibits the input of the commodity identifying information from the scanner 25, and receives the input of the commodity identifying information from the hand-held scanner 26 and the key operation. The processor 40 allows the placement of the commodity on the second commodity placement table 12 before the registration process.

If the processor 40 acquires the commodity identifying information from the hand-held scanner 26 after detecting the weight change (Yes in ACT 56), the processor 40 executes the registration process of the commodity according to the acquired commodity identifying information (ACT 58).

If the commodity identifying information is input through the key operation after detecting the weight change (Yes in ACT 57), the processor 40 executes the registration process of the commodity according to the input commodity identifying information (ACT 58).

If the registration process of the commodity in ACT 58 is completed, the processor 40 executes the weight check process for the registered commodity (ACT 61).

In the second operation example, the processor 40 receives an image recognition result, including one or more selection candidates, based on the scanned image from the scanner 25 (ACT 55). For example, the scanner 25 carries out the object recognition process on the scanned image of a commodity whose barcode image is not detected. As the object recognition process, the scanner 25 detects the commodity image from the scanned image. If the commodity image can be detected in the scanned image, the scanner 25 carries out an object recognition process for recognizing the commodity in the detected commodity image. The scanner 25 provides candidates of the commodity as a result of the image recognition process on the commodity image to the processor 40. The processor 40 acquires candidates of the commodity as a result of the image recognition process from the scanner 25.

In the above description, the scanner 25 executes the object recognition process. However, the object recognition process on the scanned image may be executed by the processor 40. In this case, the processor 40 acquires the scanned image from the scanner 25 and executes the object recognition process described above on the scanned image to obtain candidates of the commodity.

If the result of the object recognition process (or if the commodity image is detected from the scanned image) is acquired, the processor 40 carries out a candidate display process (ACT 71). The candidate display process is a process of displaying a candidate selection screen including a touch key for selecting a candidate out of the candidates of the commodity as a result of the object recognition process.

In the candidate display process, the processor 40 acquires the result of the object recognition process from the scanner 25 (ACT 81). If the result of the object recognition process is acquired, the processor 40 generates a touch key for selecting a candidate selectable on the touch panel 21b as the candidate of the commodity as the result of the object recognition process (ACT 82). If the touch key for selecting the candidate is generated, the processor 40 displays the candidate selection screen including the generated touch key for selecting the candidate on the display 21 (ACT 83). For example, the processor 40 displays the candidate selection screen as a display window in a part of display area on the display 21.

While the candidate selection screen is displayed, the processor 40 receives the input of the commodity identifying information (ACTs 72 to 74), the detection of the weight change (ACT 75) and a selection instruction of the candidate from the candidate selection screen (ACT 74).

If the scanner 25 detects the barcode from the scanned image (Yes in ACT 72), the processor 40 acquires the commodity identifying information as the reading result of the barcode from the scanner 25. If the hand-held scanner 26 detects the barcode from the scanned image (Yes in ACT 73), the processor 40 acquires the commodity identifying information as the reading result of the barcode from the hand-held scanner 26.

If the touch key for selecting the candidate on the candidate selection screen is instructed (Yes in ACT 74), the processor 40 acquires the commodity identifying information selected by the touch key. If the commodity identifying information is input though the key operation other than the candidate selection screen, the processor 40 may also acquire the input commodity identifying information.

The processor 40 detects the change in the weight on the second commodity placement table 12 while displaying the candidate selection screen (ACT 75). If the weight change is detected before the input of the commodity identifying information (Yes in ACT 75), the processor 40 receives the input of the commodity identifying information for the commodity corresponding to the weight change (ACTs 76 and 77). In this case, the processor 40 prohibits the input of the commodity identifying information by the scanner 25, and receives the input of the commodity identifying information by the hand-held scanner 26 and the key operation.

If the processor 40 acquires the commodity identifying information from the hand-held scanner 26 after detecting the weight change (Yes in ACT 76), the processor 40 executes the registration process of the commodity according to the acquired commodity identifying information (ACT 58). If the touch key for selecting the candidate on the candidate selection screen is instructed (Yes in ACT 77) after detecting the weight change, the processor 40 executes the registration process of the commodity selected by using the touch key (ACT 58).

If the registration process of the commodity (ACT 58) after the detection of the weight change is completed, the processor 40 executes the weight check process (ACT 61).

If it is determined that the weight is normal through the weight check process (Yes in ACT 62), and the registration of all commodities is not terminated (No in ACT 65), the processor 40 returns to the process in ACT 51 and sets the initial state to receive registration of the next commodity.

If it is determined that the weight is not normal through the weight check process (No in ACT 62), the processor 40 executes the error process (ACT 63). If error process is executed, the processor 40 receives an operation to eliminate the error (ACT 64). If it is determined that the error is eliminated (Yes in ACT 64), the processor 40 proceeds to the process in ACT 65. If the registration of all commodities is not completed (No in ACT 65), the processor 40 returns to the process in ACT 51 and sets the initial state to receive the registration of the next commodity. The error process and error elimination in ACTs 63 to 64 may be the same as that in ACTs 22 to 23 in FIG. 3 in the first operation example.

Furthermore, the processor 40 receives an instruction to terminate the registration process of the commodity (commodity process) and to proceed to the settlement process. If the termination of the registration of all commodities (or transition to the checkout process) is instructed (Yes in ACT 65), the processor 40 executes the settlement (checkout) process for the commodities registered in the registered commodity list (ACT 66).

As described above, the checkout apparatus according to the second operation example receives the input of the commodity identifying information in the initial state, and receives the detection of the change in the weight on the second commodity placement table and the result of the object recognition process. If the weight change is detected before the commodity identifying information is input, the checkout apparatus receives the input of the commodity identifying information. The checkout apparatus registers the commodity identifying information input after detecting the weight change, and performs the weight check based on the weight change detected immediately before the registration process of the commodity. Furthermore, in the second operation example, if the candidate of the commodity is obtained as a result of the object recognition process on the image of the commodity read by the scanner, the candidate selection screen for selecting the candidate of the commodity is displayed.

Thus, according to the second operation example, even if the commodity before registration is placed on the second commodity placement table, it is possible to display a candidate selection screen with which the candidate of the commodity obtained as the result of the image recognition process for the commodity can be selected. Furthermore, it is possible to perform the weight check after registration for the commodity which is placed on the second commodity placement table and then selected through the candidate selection screen. As a result, it is possible to provide the checkout apparatus capable of executing a process of improving the work efficiency of the customer while performing the weight check of the registered commodity.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. A checkout apparatus, comprising:
   a weighing scale configured to measure a weight of one or more objects placed on a surface thereof;
   a first information input device configured to acquire commodity identifying information corresponding to a commodity that is at an arbitrary position including the surface;
   a second information input device configured to acquire commodity identifying information corresponding to a commodity that is at a reading position of the second information input device, the reading position not including the surface; and
   a processor configured to:
      in an initial state, wait to receive the commodity identifying information from one of the first and second information input devices or a detection of a change in the weight measured by the weighting scale that is greater than a predetermined amount,
      upon receiving the commodity identifying information from one of the first and second information input devices in the initial state, detect a change in the weight measured by the weighing scale and determine whether the change is within a predetermined range that is set based on the acquired commodity identifying information,
      upon detecting the change in the weight measured by the weighing scale that is greater than the predetermined amount in the initial state, control the second information input device to not acquire the commodity identifying information and wait to receive the commodity identifying information from the first information input device, and once received, determine whether the change in the weight measured by the weighing scale is within the predetermined range that is set based on the acquired commodity identifying information,
      upon determining that the change in the measured weight on the surface is within the predetermined range, register the commodity corresponding to the acquired commodity identifying information, and return to the initial state, and
      perform a settlement processing for payment of each registered commodity.
2. The apparatus according to claim 1, wherein
the first information input device is configured to acquire the commodity identifying information through a key operation of a user.
3. The apparatus according to claim 1, wherein
the first information input device is a hand-held scanner.

4. The apparatus according to claim 3, wherein
the second information input device is a scanner in a fixed position.

5. The apparatus according to claim 4, wherein
the scanner is configured to perform object recognition on an image of the commodity to acquire the commodity identifying information.

6. The apparatus according to claim 5, wherein
the scanner is further configured to scan a barcode on the commodity to acquire the commodity identifying information.

7. The apparatus according to claim 4, wherein
the scanner is configured to acquire an image of the commodity and output the image to the processor, and
the processor is further configured to perform object recognition on the image to determine the commodity identifying information.

8. The apparatus according to claim 1, wherein
the predetermined range is stored in a memory in advance in association with each commodity identifying information, and
the processor is further configured to set the predetermined range stored in the memory and associated with the received commodity identifying information.

9. The apparatus according to claim 1, wherein
the first information input device is a touch screen display, and the second information input device is configured to acquire an image of the commodity, perform object recognition on the image, and output candidates of the commodity based on the object recognition to the processor, and
the processor is further configured to:
control the touch screen display to display the candidates of the commodity received from the second information input device, and
determine the commodity identifying information according to a selection of one of the displayed candidates on the touch screen.

10. A checkout apparatus, comprising:
a weighing scale configured to measure a weight of one or more objects placed on a surface thereof;
a hand-held scanner configured to acquire commodity identifying information corresponding to a commodity that is at an arbitrary position including the surface;
a fixed scanner configured to acquire commodity identifying information corresponding to a commodity that is at a reading position of the fixed scanner, the reading position not including the surface; and
a processor configured to:
in an initial state, wait to receive the commodity identifying information from one of the hand-held and fixed scanners or a detection of a change in the weight measured by the weighing scale that is greater than a predetermined amount,
upon receiving the commodity identifying information from one of the hand-held and fixed scanners, detect a change in the weight measured by the weighing scale and determine whether the change is within a predetermined range that is set based on the acquired commodity identifying information,
upon detecting the change in the weight measured by the weighing scale that is greater than the predetermined amount in the initial state, control the fixed scanner to not acquire the commodity identifying information and wait to receive the commodity identifying information from the hand-held scanner, and once received, determine whether the change in the weight measured by the weighing scale is within the predetermined range that is set based on the acquired commodity identifying information,
upon determining that the change in the measured weight on the surface is within the predetermined range, register the commodity corresponding to the acquired commodity identifying information, and return to the initial state, and
perform a settlement processing for payment of each registered commodity.

11. The apparatus according to claim 10, further comprising:
an operation panel configured to acquire the commodity identifying information through a key operation of a user.

12. The apparatus according to claim 10, wherein
the hand-held scanner is configured to acquire the commodity identifying information by scanning a bar code on the commodity.

13. The apparatus according to claim 12, wherein
the fixed scanner is configured to acquire the commodity identifying information by scanning a bar code on the commodity.

14. The apparatus according to claim 13, wherein
the fixed scanner is configured to perform object recognition on an image of the commodity to acquire the commodity identifying information.

15. The apparatus according to claim 10, wherein
the fixed scanner is configured to acquire an image of the commodity and outputs the image to the processor, and
the processor is further configured to perform object recognition on the image to determine the commodity identifying information.

16. The apparatus according to claim 10, wherein
the predetermined range is stored in a memory in advance in association with each commodity identifying information, and
the processor is further configured to set the predetermined range stored in the memory and associated with the received commodity identifying information.

17. The apparatus according to claim 10, further comprising:
a touch screen display, wherein
the fixed scanner is configured to acquire an image of the commodity, performs object recognition on the image, and output candidates of the commodity based on the object recognition to the processor, and
the processor is further configured to:
control the touch screen display to display the candidates of the commodity received from the fixed scanner, and
determine the commodity identifying information according to a selection of one of the displayed candidates on the touch screen.

18. A method of controlling a checkout apparatus that includes a weighing scale configured to measure a weight of one or more objects placed on a surface thereof, a hand-held scanner configured to acquire commodity identifying information corresponding to a commodity that is at an arbitrary position including the surface, and a fixed scanner configured to acquire commodity identifying information corresponding to a commodity that is at a reading position of the fixed scanner, the reading position not including the surface, the method comprising:
in an initial state, waiting to receive the commodity identifying information from one of the hand-held and fixed scanners or a detection of a change in the weight measured by the weighing scale that is greater than a predetermined amount;

upon receiving the commodity identifying information from one of the hand-held and fixed scanners, detecting a change in the weight measured by the weighing scale and determine whether the change is within a predetermined range that is set based on the acquired commodity identifying information;

upon detecting the change in the weight measured by the weighing scale that is greater than the predetermined amount in the initial state, controlling the fixed scanner to not acquire the commodity identifying information and waiting to receive the commodity identifying information from the hand-held scanner, and once received, determine whether the change in the weight measured by the weighing scale is within the predetermined range that is set based on the acquired commodity identifying information;

upon determining that the change in the measured weight on the surface is within the predetermined range, registering the commodity corresponding to the acquired commodity identifying information, and returning to the initial state; and performing a settlement processing for payment of each registered commodity.

* * * * *